(12) United States Patent
Jordil et al.

(10) Patent No.: US 7,282,017 B2
(45) Date of Patent: Oct. 16, 2007

(54) TOOL-SWITCHING DEVICE

(75) Inventors: Pascal Jordil, Ecoteaux (CH); Claude Rouge, Baulmes (CH); Benjamin Vuilloud, Vufflens-la-Ville (CH); Adriano Zanier, Prilly (CH)

(73) Assignee: Tesa SA, Renens (CH)

( * ) Notice: Subject to any disclaimer, the term of this patent is extended or adjusted under 35 U.S.C. 154(b) by 0 days.

(21) Appl. No.: 11/072,825

(22) Filed: Mar. 4, 2005

(65) Prior Publication Data

US 2005/0207857 A1    Sep. 22, 2005

(30) Foreign Application Priority Data

Mar. 18, 2004   (EP)   ................... 04101125

(51) Int. Cl.
*B23Q 3/155* (2006.01)
*B23C 31/107* (2006.01)
*B23B 31/171* (2006.01)
*G01B 7/008* (2006.01)
*G01B 5/008* (2006.01)

(52) U.S. Cl. ................. 483/16; 483/58; 483/901; 279/71; 279/75; 33/559; 33/558.3; 33/556

(58) Field of Classification Search .............. 483/901, 483/16, 10, 58; 409/234, 232; 408/239 R; 279/22, 29–30, 71–72, 75, 904, 905; 82/158, 82/160; 33/559, 560, 561, 556, 558, 558.3

See application file for complete search history.

(56) References Cited

U.S. PATENT DOCUMENTS

| | | | | | |
|---|---|---|---|---|---|
| 4,549,846 | A | * | 10/1985 | Torii et al. ................ | 901/30 |
| 4,706,372 | A |   | 11/1987 | Ferrero et al. | |
| 4,906,123 | A | * | 3/1990 | Weskamp et al. ........... | 901/28 |
| 5,452,631 | A | * | 9/1995 | Erickson ................... | 82/160 |
| 6,012,230 | A | * | 1/2000 | McMurtry et al. .......... | 33/559 |
| 6,276,864 | B1 |   | 8/2001 | Ruso et al. | |
| 6,840,895 | B2 | * | 1/2005 | Perry et al. ............... | 483/1 |
| 2004/0142803 | A1 | * | 7/2004 | Fitzgibbon ................ | 483/9 |

FOREIGN PATENT DOCUMENTS

| CH | 681967 A | | 6/1993 |
|---|---|---|---|
| DE | 31 51 532 A1 | | 7/1983 |
| JP | 60-123239 A | * | 7/1985 |

* cited by examiner

*Primary Examiner*—Erica Cadugan
(74) *Attorney, Agent, or Firm*—Pearne & Gordon LLP (57) ABSTRACT

Tool-switching device for a machine for measuring coordinates wherein the tool is fastened on the tool-carrier and held by the action of elements exerting an axial force. The locking force is taken over symmetrically by the elements of a Boys connection, which increases the repeatability of the connection; in one embodiment, two pins or spheres are driven by a sliding bushing provided with two "V"-shaped slits or with two lateral gorges. In the subsequent embodiments, the pins are replaced by spheres, by levers or by a stirrup.

12 Claims, 7 Drawing Sheets

FIG. 19

TOOL-SWITCHING DEVICE

REFERENCE DATA

This application claims priority from European patent application 2004EP-101125 filed on Mar. 18, 2004, the contents whereof are hereby incorporated by reference.

FIELD OF THE INVENTION

The present invention pertains to a fast connection device for connecting two mechanical elements in accurate and repeatable fashion, by manual action or under the action of an appropriate servomechanism.

DESCRIPTION OF RELATED ART

The present invention is suited especially, though not exclusively, for connecting a touch sensor and an articulated head of a machine for measuring coordinates. However, the type of connection of the invention could just as well apply to a large number of different situations where a mechanical connection that is both fast and accurate is required. In particular, the device of the present invention can for example be used for connecting a video camera or for any other known sensor.

Devices enabling the tools of a machine for measuring coordinates to be switched manually or automatically are known. These devices sometimes propose screw or bayonet couplings. Most often, these couplings propose several positioning surfaces arranged to lead to an isostatic connection having a high level of repeatability.

European patent EP142373 describes a tool-switching device comprising a tool-carrier provided with a hollow eccentric into which the head of an adapter engages. The rotation of the eccentric directly drives the adapter's head also joining the two parts.

These switching devices however have the disadvantage that the tool can become detached from the adapter if the operator forgets to lock the connection.

Some of these switching devices, and notably those that are based on a screw or bayonet connection, suggest a rotation of the tool and do not allow a high number of electric connections between the tool and the measuring machine.

Another disadvantage of the prior art devices, and notably of the devices in which an eccentric acts directly on a fixed element of the adapter, is that the holding force is not oriented along the axis of the tool carrier, or generates torsional or flexional couples, so that during locking, the forces exerted on the positioning surfaces are not distributed symmetrically, which can cause a poor repeatability of the positioning.

An aim of the present invention is to supply a tool connection and switching device free from the limitations of the prior art. In particular, an aim of the present invention is to propose a tool-switching device in which the tool can be held without any locking operation being necessary.

Another aim of the present invention is to propose a device in which the locking forces are aligned with the symmetry axis in order to ensure an equal distribution of forces between the positioning surfaces.

Another aim of the present invention is to propose a tool-switching device that is simpler and more accurate than the prior art devices.

BRIEF SUMMARY OF THE INVENTION

According to the invention, these aims are achieved by the device being the object of the main claim, and notably by a tool-switching device, comprising:

at least one removable tool-carrier;

an adapter adapted for being fastened to a machine for measuring coordinates;

positioning surfaces arranged on said tool-carrier and on said adapter defining a removable isostatic connection between said tool-carrier and said adapter;

a first coupling means in said tool-carrier and a second coupling means in said adapter;

an actuator in said adapter or in said tool-carrier driving one of said first coupling means or second coupling means, said actuator being capable of taking a locked position and an unlocked position;

said first and second coupling means locking said tool-carrier relatively to said adapter in a relative position defined by said isostatic connection when said actuator is in said locked position, wherein the force exerted during locking on said first and second coupling means is aligned to an axis of said tool-carrier.

BRIEF DESCRIPTION OF THE DRAWINGS

The present invention will be better understood by reading the attached claims and the description given by way of example and illustrated by the attached figures in which:

DETAILED DESCRIPTION OF POSSIBLE EMBODIMENTS OF THE INVENTION

Figure 7:
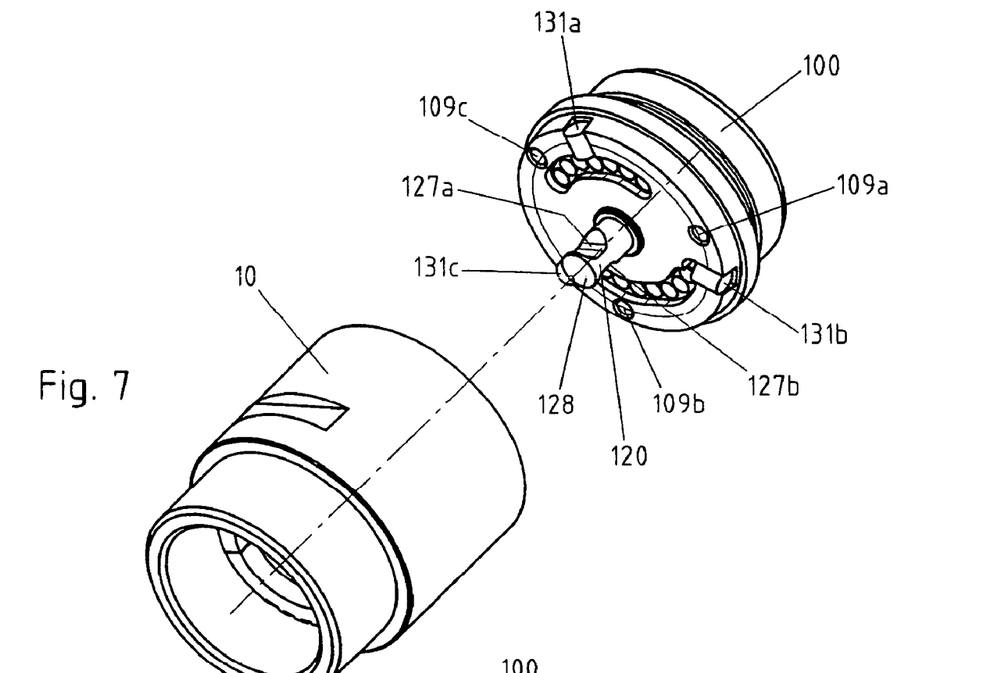
FIGS. 7 and 8 show the tool-carrier with its corresponding adapter.
Figure 8:
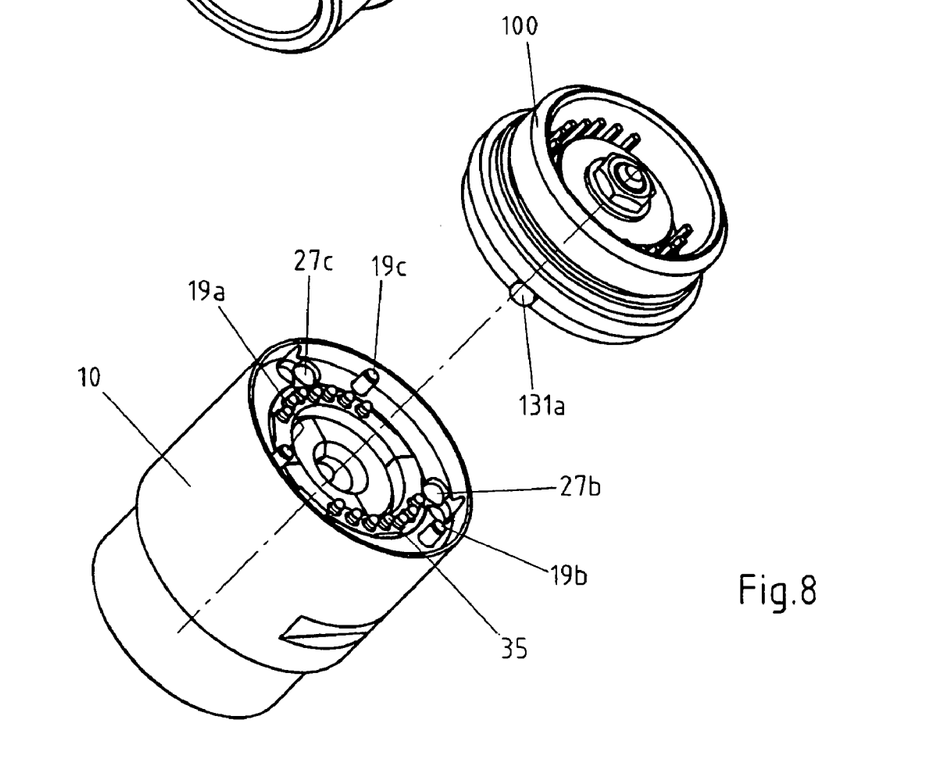

In a first embodiment of the invention, described now with reference to FIGS. 7 and 8, the inventive device comprises an adapter 100, designed to be fastened to the arm of the measuring machine and a removable tool-carrier 10 for fastening it to the sensor or to the attachment.

With reference to the FIGS. 1-5, the tool-carrier 10 comprises a cylindrical body 20, a fixed bushing 30 and a mobile interior bushing 40 capable of sliding inside the fixed bushing 30 and coaxial therewith. In the following, the axis of the bushings 30 and 40 will be designated as "vertical axis", referring in this to a conventional orientation and only for the purpose of linguistic simplification. The inventive device can be used in any orientation in space.

To make the assembly and machining easier, each of the bushings 30 and 40 is advantageously made in to parts 30a and 30b, resp. 40a and 40b.

The connection and disconnection of the adapter 100 and of the tool-carrier 10 are determined by the action of an actuator 50. In this embodiment, the actuator is an eccentric 50 capable of turning around a horizontal axis, defined by the two openings 37 and 38 of the fixed bushing and vertically driving the mobile bushing 40. Two pins 53a and 53b are lodged in two grooves 47 positioned in "V" in the mobile bushing 40 and can take on, by sliding between said grooves 47, positions more or less apart relatively to the axis of the tool-carrier but always orthogonal to the common axis of the bushings 30 and 40.

The extremities of the pins 53a and 53b exceed the outer surface of the mobile bushing 40 and are inserted in two lodgings 32 of the fixed bushing 30, serving to block the vertical run of the two pins. A rotation of the eccentric 50 drives axially the mobile bushing 40 and causes either a movement of the pins 53a and 53b towards each other or away from one another, or a vertical movement (conventionally in the direction of the axis) of the two pins.

In particular, the shape of the lodgings 32 is chosen in this embodiment so as to determine, in a first part of the rotation of the eccentric 50 between −90° and 0+, a movement of the pins towards each other or away from one another and, in a second part of the rotation of the eccentric 50 between 0° and 90°, a vertical movement of the two pins. Other arrangements are however comprised within the present invention.

Two spring blades 56a and 56b prevent the pins 53a and 53b from moving freely in their respective lodgings. Thus, the device can be used in all positions, even when the axis is not oriented according to the vertical direction.

The coupling between the adapter 100 and the tool-carrier 10 is now described with reference to FIGS. 9, 10 and 11.

Reverting now to FIGS. 7 and 8, the adapter 100 comprises a male element constituted by the stud 120 with coned head 128 and provided with two lateral grooves 127a and 127b. The FIGS. 9, 10 and 11 show the adapter 100 and its stud 120 in connection with the fixed part 10 of the connector in the arrangements corresponding to the positions −90°, 0° and 90° of the eccentric 50.

Figures 9, 10:
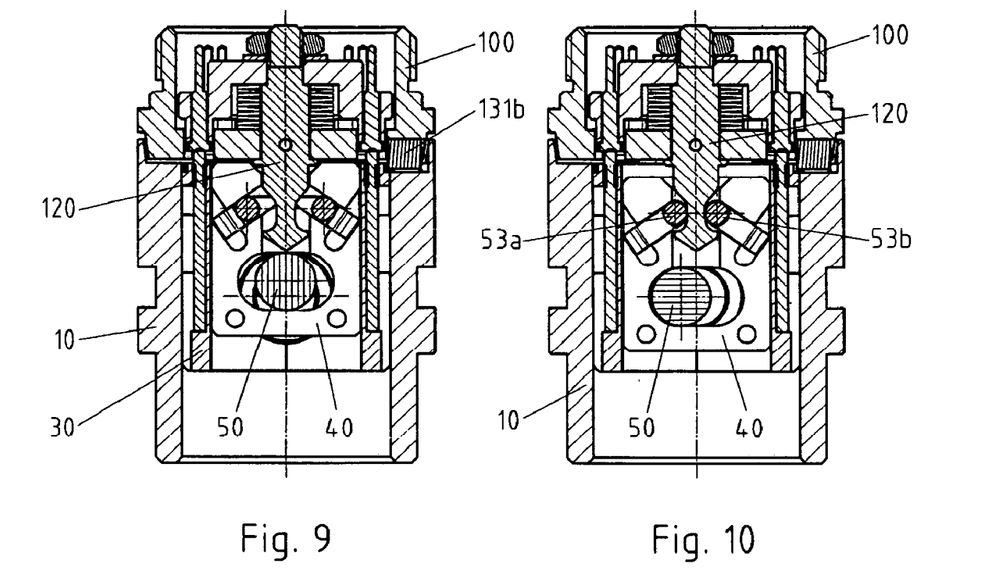
FIGS. 9, 10 and 11 show in cross section the locking action of a device according to the invention.

The −90° position visible in FIG. 9 is an open position. By turning the eccentric from 0° to −90°, since the pins are on the one hand guided by the "V"-shaped grooves 47 of the bushing 40 and blocked vertically by the lodging 32 of the fixed bushing 30, they move apart in the horizontal plane. When the pins 53a and 53b are moved totally apart, the stud 120 can pass through and freely come out of its lodging.

In the intermediate position at 0° visible in FIG. 10, the pins 53a and 53b are free to move closer together, under the action of the two spring blades 56a and 56b. They can however move apart, under the action of an external force, and it is possible to push the stud 120 in position between the two pins 53a and 53b. When the stud is pushed vertically, the coned head 128 pushes the two pins 53a and 53b apart until they engage in the grooves 127a and 127b of said stud. In this position, the tool-carrier 10 is held in position but not locked.

Figure 11:
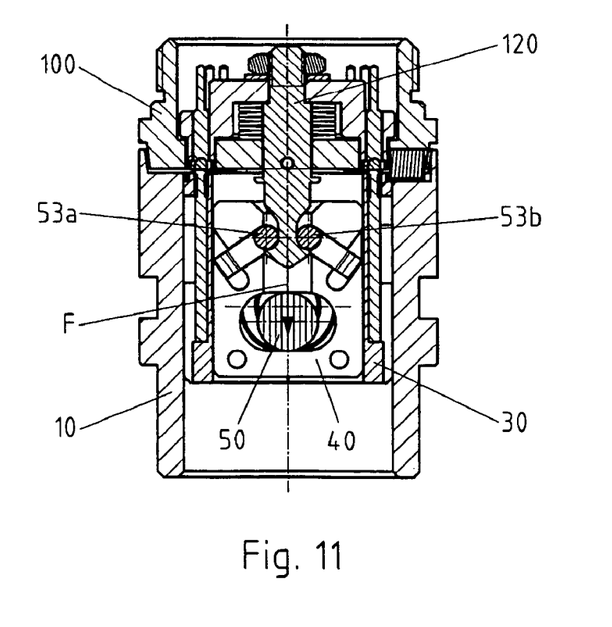

The position at +90° of FIG. 11 is a locked position. Once the pins 53a and 53b are engaged in the grooves and the eccentric 50 is turned in this position, the mobile bushing 30 finds itself in its position at a maximum distance relatively to the plane of connection. In this arrangement, the pins exert an axial force F on the stud 120 and unite the tool-carrier 10 with the adapter 100.

When the actuator is in intermediate position at 0°, the tool-carrier can be simply clasped on the adapter 100 without any action on the actuator 50 being necessary. A locking simply ensures an exact and repeatable positioning of the tool but it is not required for holding the tool in place.

Advantageously, the locked position can also correspond to an angle of rotation of the eccentric 50 slightly greater than +90° in order to ensure a stable locking.

One should incidentally not interpret the above example in the sense that the control device 50 must compulsorily take up the three positions −90°, 0° and +90°, as the present invention also comprises other embodiments having different control positions. The eccentric could also be replaced by a cam, a screw, a lever, an electric or pneumatic jack or by any other actuating means known.

It is also possible to invert the position of the stud and of the pins by placing the first on the tool-carrier and the latter on the adapter.

The run of the eccentric 50 is limited by limiting means (not represented), for example a peripheral groove in the eccentric into which a pin united with the fixed element 10.

Figure 1:
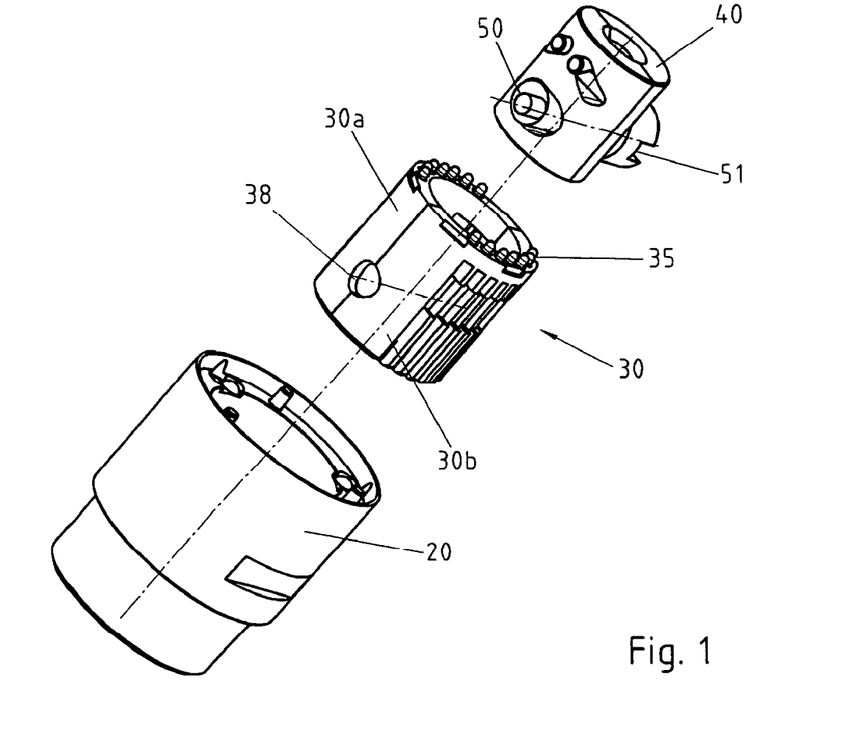
FIG. 1 shows a tool-carrier according to a first embodiment of the invention.
Figure 2:
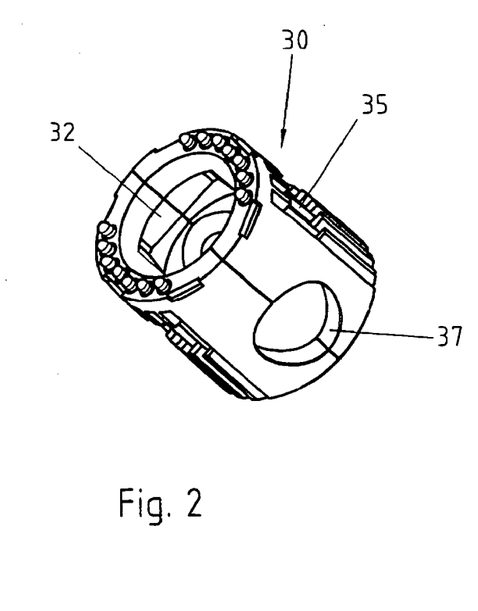
FIGS. 2 and 3 show the components of the tool-carrier of FIG. 1.
Figure 3:
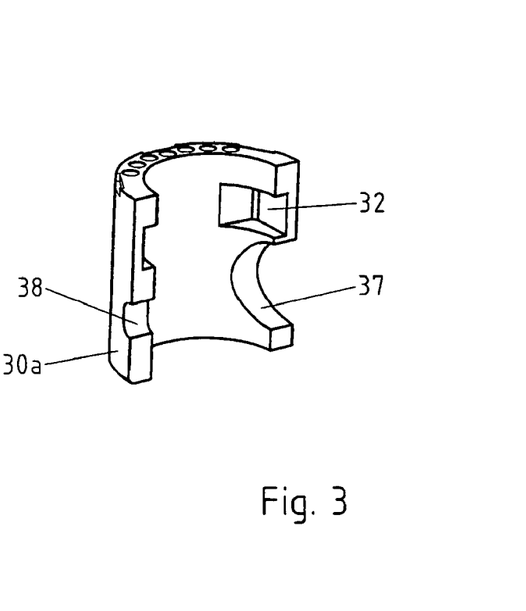
Figures 4, 5:
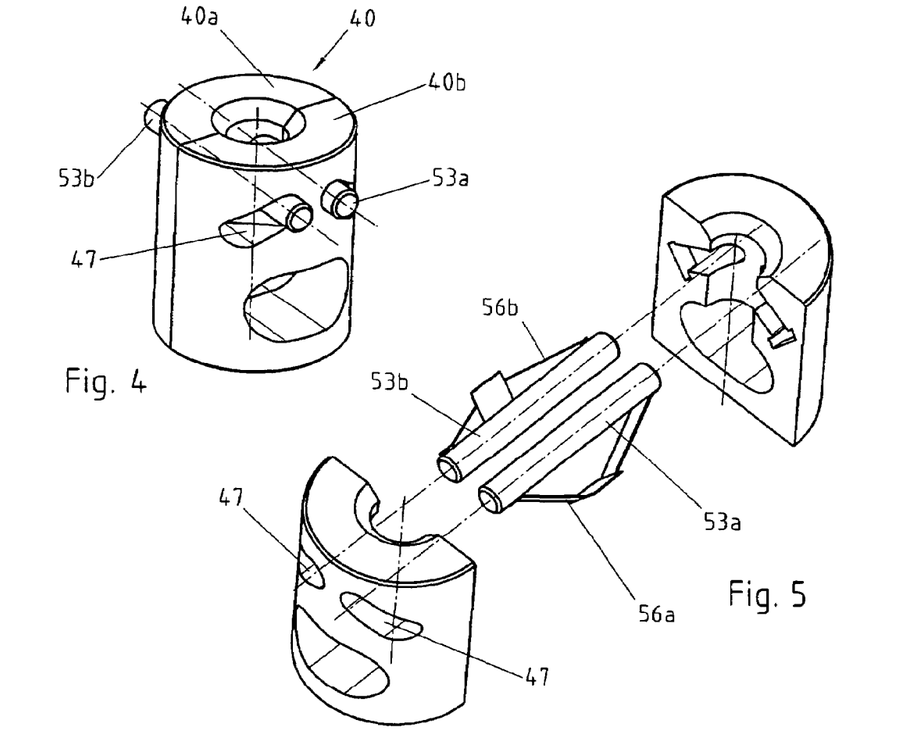
FIGS. 4 and 5 show the tool-carrier of FIG. 1 partially assembled.
Figure 6:
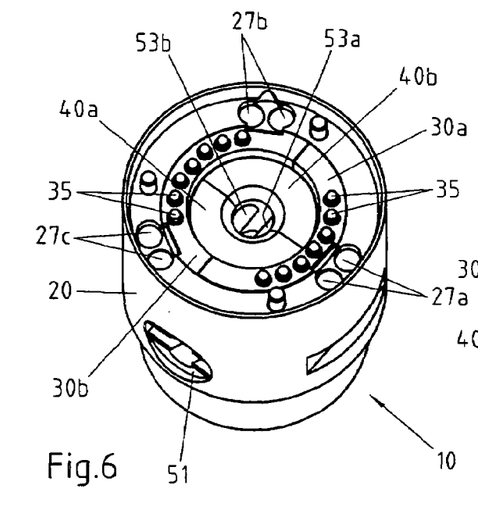
FIGS. 6 and 6a show two views of the tool-carrier of FIG. 1 assembled.
Figure 6A:
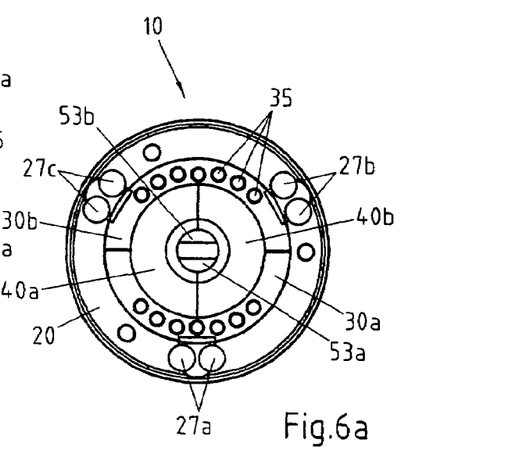
Figure 19:
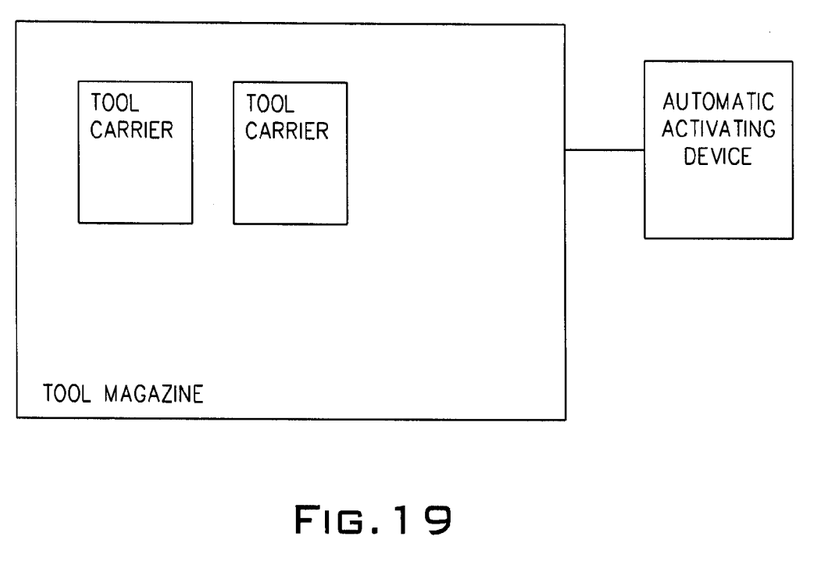
FIG. 19 schematically shows a tool magazine.

The rotation of the eccentric 50 is, in this embodiment of the invention, ensured by the notch 51, visible in FIG. 6, capable of coupling with the blade of a screwdriver or with a motorized actuator of an automatic tool magazine as schematically shown in FIG. 19. Other forms of coupling are however possible.

With reference to FIGS. 6, 6a, 7 and 8, the accuracy of the relative positioning of the tool-carrier 10 relatively to the adapter 100 is ensured by the six spheres 27a, 27b, 27c of the mobile part and the three cylinders 131a, 131b, 131c of the fixed part. These elements define six independent contact points and constitute an isostatic connection according to the principle of the Boys connection.

This manner of arranging the positioning surfaces lends itself to many embodiments, for example it is possible to exchange the positions of the cylinders and of the spheres, or to replace the cylinders and the spheres by any combination of positioning surfaces giving rise to six independent contact points, or to an isostatic connection, whilst remaining within the framework of the present invention.

Thanks to the alignment of the holding force F with the axis of the tool-carrier, the connection is not subjected to any torsion or flexion action through the locking operation, and the force F is distributed equally between the positioning surfaces.

For the same reason, the resultant of the forces exerted on each of the positioning pins 131a, 131b, 131c is also oriented axially, which is not the case in the prior art devices.

Tests under controlled conditions have made it possible to verify the improvement in repeatability for positioning the connector of the invention. In the following example, a comparison was made between a connector according to this embodiment of the invention and a reference connector in which the locking is achieved by an eccentric acting directly on a stud of the tool-carrier and inducing in it a flexional couple.

Each connector, conditioned to a temperature of 20° C., was locked 10 times, and each time the position of a point situated 50 mm forward of the connection plane was measured, and the distance relative to the nominal position was recorded.

The results of the test, expressed in micrometers, are summarized in table 1.

Usually, the tool-carrier 10 bears a sensor or a trigger probe for measuring coordinates or inspect mechanical parts. In order to ensure the feeding and the communication, the tool-carrier 10 has, on its side designed to contact the adapter 100, a series of electric contact points 35, represented in FIG. 8. During connection, these points 35 contact the corresponding conductor elements on the adapter 100.

Optionally, the tool-carrier has on its side at least one additional pin engaging in a corresponding hole of the adapter 100. This pin serves as polarizing slot and allows a single connection position, thus avoiding a poor repeatability of positioning and incorrect electric connections.

Preferably, at least one of the contact points 35 is dimensioned so as not to contact the corresponding element on the adapter 100 when the tool-carrier is clasped but not locked. This allows the lack of locking of the tool-carrier to be detected and to prevent measuring errors, for example by introducing control instructions in the control program of the measuring apparatus. Other means for detecting the lack of locking can also be used according to the case.

In a preferred embodiment represented in FIGS. 7 and 8, the tool-carrier bears three alignment pins 19a, 19b, 19c placed at unequal angles in order to protect the electric contact points while the indexation position is sought. The three alignment pins are inserted in three corresponding holes 109a, 109b, 109c of the adapter 100. Other alignment means are also possible.

Preferably, the male stud 120 is connected to the adapter 100 by a spring or an elastic element. This allows the locking force to be mastered and tolerances to be compensated.

Figures 12, 13:
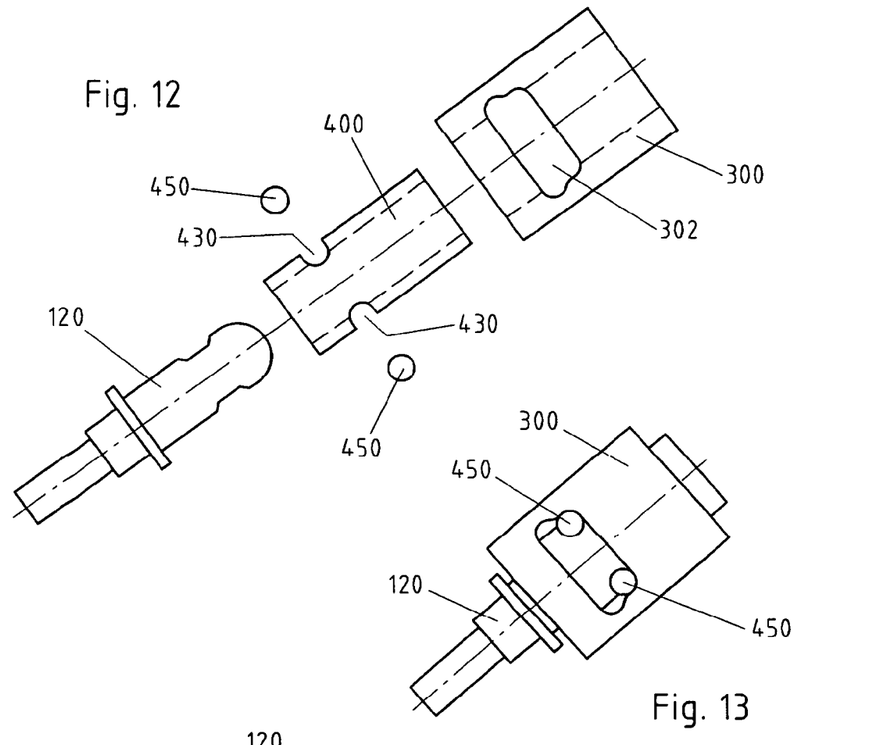
FIGS. 12 and 13 show a subsequent embodiment of the invention.

According to another embodiment of the invention, illustrated in FIGS. 12 and 13, the tool-carrier 10 comprises a bushing 400 sliding inside a guiding bushing 300. The sliding bushing 400 provides two slits 430 in which are lodged two rollers 450.

Through the action of the slits 430 the sliding bushing defines the axial position of the two rollers 450 when it moves vertically. On the other hand, the distance of the rollers 450 to the device's axis is determined by the profile of the windows 302 of the guiding bushing 300.

When the sliding bushing 400 is displaced vertically, the pins move towards the connector's axis and move axially. This combined movement allows the tool-carrier 10 to be held and locked onto the adapter 100 by the stud 120 whose structure is similar to that of the first embodiment already described. The force exerted on the stud 120 is essentially axial.

Variant embodiments are also possible, while remaining within the scope of the present invention. For example, the rollers 450 could be replaced by balls and the profiled windows 302 could be omitted in favor of a widening of the guiding bushing 300. In this case, the inclined inner surface of the fixed bushing 300 pushes the balls in the direction of the axis when the bushing 400 moves axially.

Figure 15:
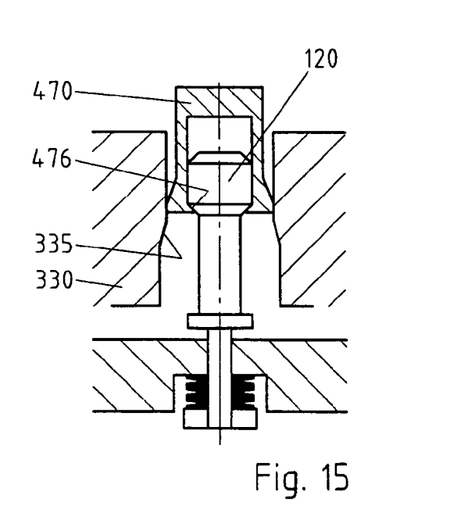
FIG. 15 shows a subsequent embodiment of the invention.

In a subsequent embodiment of the invention, shown in FIG. 15, the sliding bushing 400 is replaced by a flexible fork 470 having profiled tips 476. An actuating mechanism (not represented) displaces the fork 470 vertically inside a guiding bushing 330 whose inner profile 335 tapers as it recedes from the connection plane. The profiles 476 of the tips of the fork 470 are chosen so as to move the axis of the tips of the fork 470 closer together when the latter is moved vertically in order to hold the lateral gorge of the stud 120 and lock the tool-carrier on the adapter by the stud 120. The force exerted on the stud 120 is essentially axial.

Although the fork 470 has been represented in FIG. 15 with two branches, this should not be interpreted as a limitation of the invention, which also comprises embodiments with forks having several branches.

Figure 16:
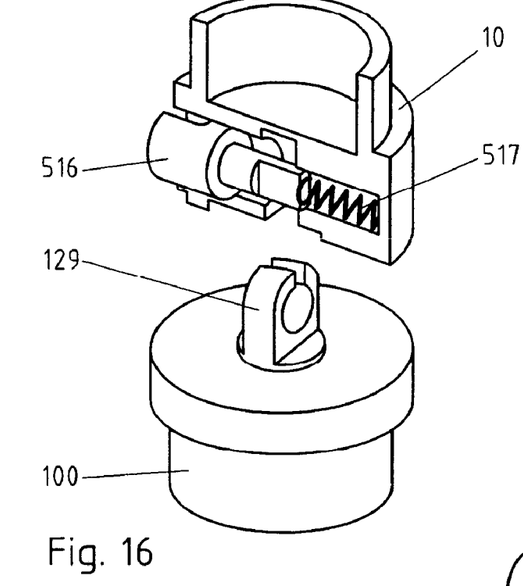
FIGS. 16, 17 and 18 show a subsequent example of connector.

A subsequent embodiment will not be described with reference to FIGS. 16, 17 and 18. The adapter 100 comprises in this case a split hook 129 mounted on a spring (not represented), whose function is to control the locking force and to compensate the tolerances.

The tool-carrier 10 comprises an eccentric 516 ending at one extremity in a flattened part 513 and capable at the same time to turn around its axis and to slide axially, under the action of a spring 517.

In unlocked position (FIG. 1), the eccentric 516 is pushed by the spring 517 and thus presents its flattened part to correspond with the slit of the hook 129. In this configuration, the tool-carrier can enter and exit freely.

Figure 17:
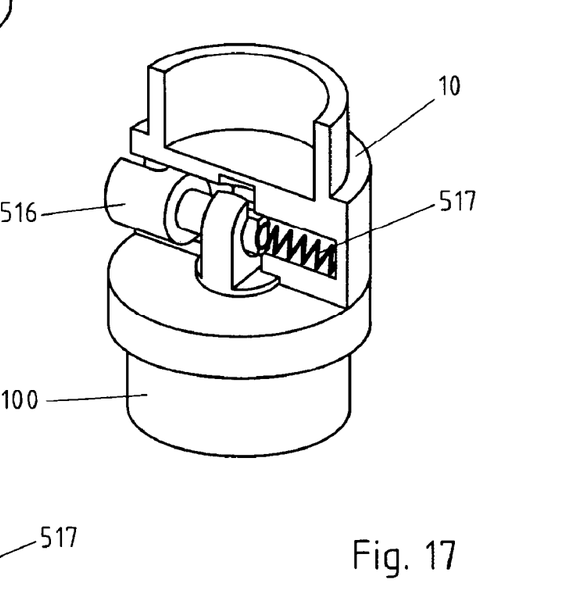
Figure 18:
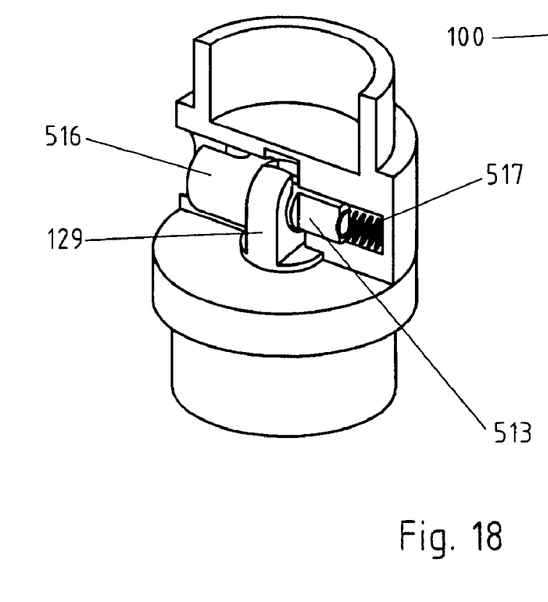

In the configuration shown in FIG. 17, the two parts are connected but not locked. To lock the connection, it is necessary to press on the eccentric 516 in order for it to engage in the hook 129, as represented in FIG. 18, and to turn it so as to exert a traction force joining the two parts.

Figure 14:
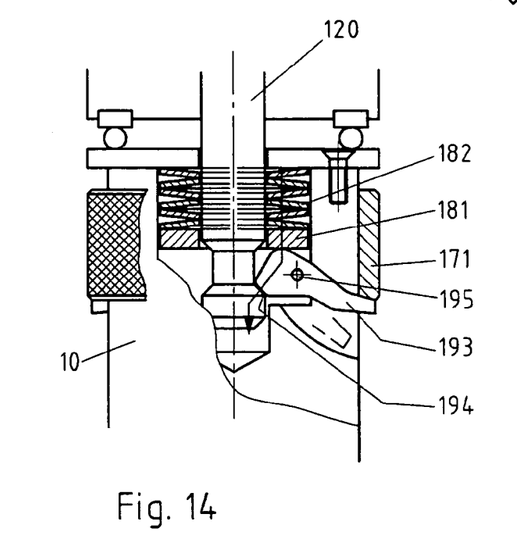
FIG. 14 shows a subsequent embodiment of the invention.

A subsequent embodiment of the invention will now be described with reference to FIG. 14. The tool-carrier 10 comprises in this example at least one lever 193 pivoting around an axis 195. In resting position, the lever is held in horizontal position through the action of the resting ring 181 pushed by the spring 182. A loosening bushing 171 allows the lever to be lifted, thus allowing the stud 120 to be introduced or extracted.

By shifting the bushing 171 to its normal position, the extremity 194 of the lever 193 moves in an axial direction and moves towards the axis so as to block and lock the tool-carrier 10 on the adapter 100 by the stud 120. The force exerted on the stud 120 is essentially axial.

Advantageously, the inventive connector will be used in a machine for measuring three-dimensional coordinates, equipped with several measuring attachments. The head part 100 of the connector is then fastened on the arm of the machine and the required attachments, each provided with a tool-carrier 10, are stored in a rack accessible by the arm of the measuring machine. In this manner, a machine for measuring coordinates equipped with the tool-switching system of the invention can perform automatically measuring cycles comprising use of different tools or attachments.

TABLE 1

| measurement | distance/µm | |
|---|---|---|
| | reference | invention |
| 1 | 0.56 | 0.23 |
| 2 | 1.46 | 0.26 |
| 3 | 1.52 | 0.63 |
| 4 | 2.03 | 0.24 |
| 5 | 2.34 | 0.64 |
| 6 | 1.84 | 0.35 |
| 7 | 1.61 | 0.23 |
| 8 | 0.95 | 0.3 |
| 9 | 1.3 | 0.4 |
| 10 | 2.84 | 0.22 |
| average | 1.645 | 0.35 |

The invention claimed is:

1. Tool-switching device, comprising:
   at least one removable tool-carrier;
   an adapter adapted for being fastened to a machine for measuring coordinates;
   positioning surfaces arranged on said tool-carrier and on said adapter defining a removable isostatic connection between said tool-carrier and said adapter;

a first coupling means in said tool-carrier and a second coupling means in said adapter;

one of said coupling means having an actuator, rotatable about an axis and having a camming portion that is eccentric relative to the rotation axis, and driving said first coupling means, said actuator being capable of taking a locked position and an unlocked position;

said first and second coupling means locking said tool-carrier relatively to said adapter in a relative position defined by said isostatic connection when said actuator is in said locked position, wherein the force exerted during locking on said first and second coupling means is aligned to a longitudinal axis of said tool-carrier.

2. The tool-switching device of claim 1, wherein the force exerted during locking on said first and second coupling means is distributed between said positioning surfaces.

3. The tool-switching device of claim 1, wherein said actuator drives said first coupling means in a first direction parallel to the axis of said tool-carrier and in a second direction, different from said first direction.

4. The tool-switching device of claim 1, wherein said actuator is rotatable around an axis that is substantially perpendicular to said longitudinal axis of said tool-carrier.

5. The tool-switching device of claim 1, wherein said first coupling means comprises two pins and said second coupling means is a stud provided with two lateral grooves.

6. The tool-switching device of claim 5, comprising:

an empty volume inside said tool-carrier;

the eccentric camming portion driving a bushing inside said empty volume in a direction of said axis;

two lateral slits of said bushing inclined relatively to said direction and converging towards said axis;

wherein:

said pins pass through said bushing through said two slits;

the extremities of each of said pins engage in recesses opening towards said empty volume.

7. The tool-switching device of claim 6, comprising resilient elements interposed between said pins and said bushing.

8. The tool-switching device of claim 1, wherein said actuator also allows an insertion position, allowing clasping between said tool-carrier and said adapter and holding of said tool-carrier.

9. The tool-switching device of claim 1 comprising at least one electric connection between said adapter and said tool-carrier.

10. The tool-switching device of claim 9, wherein said actuator also allows an insertion position, allowing clasping between said tool-carrier and said adapter and wherein at least one of said electric connections is dimensioned so as to remain open when said actuator is in said insertion position.

11. The tool-switching device of claim 1 comprising at least one alignment element.

12. The tool-switching device of one of the preceding claims, comprising a plurality of tool-carriers stored in a magazine accessible by said adapter and at least one automatic actuating device for acting on said actuators of said tool-carriers.

* * * * *